(12) United States Patent
Marty et al.

(10) Patent No.: US 9,694,238 B2
(45) Date of Patent: Jul. 4, 2017

(54) TRAJECTORY DETECTION AND FEEDBACK SYSTEM FOR TENNIS

(71) Applicant: Pillar Vision, Inc., Menlo Park, CA (US)

(72) Inventors: Alan W. Marty, Menlo Park, CA (US); Thomas A. Edwards, Menlo Park, CA (US)

(73) Assignee: PILLAR VISION, INC., Menlo Park, CA (US)

( * ) Notice: Subject to any disclaimer, the term of this patent is extended or adjusted under 35 U.S.C. 154(b) by 358 days.

(21) Appl. No.: 13/745,429

(22) Filed: Jan. 18, 2013

(65) Prior Publication Data

US 2013/0130845 A1 May 23, 2013

Related U.S. Application Data

(63) Continuation of application No. 12/015,445, filed on Jan. 16, 2008, now Pat. No. 8,409,024, and a
(Continued)

(51) Int. Cl.
*A63F 9/24* (2006.01)
*A63B 24/00* (2006.01)
(Continued)

(52) U.S. Cl.
CPC ...... *A63B 24/0021* (2013.01); *A63B 24/0003* (2013.01); *A63B 24/0084* (2013.01);
(Continued)

(58) Field of Classification Search
None
See application file for complete search history.

(56) References Cited

U.S. PATENT DOCUMENTS 420,788 A 2/1890 Hart
4,160,942 A 7/1979 Lynch et al.
(Continued)

FOREIGN PATENT DOCUMENTS

EP 0 704 715 9/1995
FR 2 710 434 9/1993
(Continued)

OTHER PUBLICATIONS

Office Action dated Aug. 4, 2010 in U.S. Appl. No. 11/508,004.
(Continued)

*Primary Examiner* — Paul A D'Agostino
(74) *Attorney, Agent, or Firm* — Maynard Cooper & Gale, P.C.; Jon Holland

(57) ABSTRACT

A system for capturing and analyzing a trajectory of a tennis ball or other object associated with a play of a game of tennis and providing feedback is described. The system may be designed to capture and analyze a trajectory of a tennis ball during various activities related to the play of a game of tennis. The system may be configured to provide immediate feedback that may be utilized by a player to improve their performance as well as provide entertainment value above and beyond what is normally associated with the play of a game of tennis. Further, the system may be operable for use in an area where tennis is normally played during normal playing activities, such as player playing a game or practicing on an outdoor tennis court. The system may be operable to account for factors associated with its ambient environment, such as wind, temperature and humidity.

39 Claims, 7 Drawing Sheets

Related U.S. Application Data continuation-in-part of application No. 11/508,004, filed on Aug. 21, 2006, now Pat. No. 7,854,669, which is a continuation-in-part of application No. 10/242,373, filed on Sep. 11, 2002, now Pat. No. 7,094,164.

(60) Provisional application No. 60/880,773, filed on Jan. 16, 2007, provisional application No. 60/323,029, filed on Sep. 12, 2001, provisional application No. 60/348,057, filed on Jan. 11, 2002, provisional application No. 60/395,875, filed on Jul. 12, 2002.

(51) Int. Cl.
  *A63B 55/00* (2015.01)
  *A63B 69/36* (2006.01)
  *A63B 69/00* (2006.01)
  *A63B 69/38* (2006.01)

(52) U.S. Cl.
  CPC .......... *A63B 55/00* (2013.01); *A63B 69/0071* (2013.01); *A63B 69/3614* (2013.01); *A63B 69/3623* (2013.01); *A63B 69/38* (2013.01); *A63B 2220/806* (2013.01); *A63B 2225/20* (2013.01); *A63B 2225/50* (2013.01)

(56) References Cited

U.S. PATENT DOCUMENTS

| | | | |
|---|---|---|---|
| 4,177,994 A | 12/1979 | Lindquist | |
| 4,337,049 A | 6/1982 | Connelly | |
| 4,545,576 A | 10/1985 | Harris | |
| 4,565,527 A | 1/1986 | Burchett | |
| 4,893,182 A | 1/1990 | Gautraud et al. | |
| 4,999,603 A * | 3/1991 | Mele et al. | 340/323 R |
| 5,039,977 A | 8/1991 | Mele et al. | |
| 5,092,602 A | 3/1992 | Witler et al. | |
| 5,138,322 A | 8/1992 | Nuttall | |
| 5,210,603 A | 5/1993 | Sabin | |
| 5,303,924 A | 4/1994 | Kluttz et al. | |
| 5,342,041 A | 8/1994 | Agulnek et al. | |
| 5,342,051 A | 8/1994 | Rankin et al. | |
| 5,365,247 A | 11/1994 | Van der Veen et al. | |
| 5,365,427 A * | 11/1994 | Soignet et al. | 473/448 |
| 5,375,832 A | 12/1994 | Witler et al. | |
| 5,398,936 A | 3/1995 | Kluttz et al. | |
| 5,413,345 A | 5/1995 | Nauck | |
| 5,430,435 A * | 7/1995 | Hoch et al. | 340/573.7 |
| 5,471,383 A * | 11/1995 | Gobush et al. | 700/91 |
| 5,486,001 A | 1/1996 | Baker | |
| 5,489,099 A | 2/1996 | Rankin et al. | |
| 5,489,886 A | 2/1996 | Wexler et al. | |
| 5,507,485 A | 4/1996 | Fisher | |
| 5,515,378 A | 5/1996 | Roy et al. | |
| 5,542,988 A | 8/1996 | Bogus | |
| 5,562,550 A | 10/1996 | Chartrand | |
| 5,566,934 A | 10/1996 | Black et al. | |
| 5,697,791 A | 12/1997 | Nashner et al. | |
| 5,768,151 A | 6/1998 | Lowy et al. | |
| 5,798,519 A | 8/1998 | Vock et al. | |
| 5,868,578 A | 2/1999 | Baum | |
| 5,879,246 A | 3/1999 | Gebhardt et al. | |
| 5,938,545 A | 8/1999 | Cooper et al. | |
| 6,073,086 A | 6/2000 | Marinelli | |
| 6,093,923 A | 7/2000 | Vock et al. | |
| 6,095,928 A | 8/2000 | Goszyk | |
| 6,133,946 A | 10/2000 | Cavallaro | |
| 6,142,437 A | 11/2000 | Wilkins, Jr. | |
| 6,148,271 A | 11/2000 | Marinelli | |
| 6,179,720 B1 | 1/2001 | Rankin et al. | |
| 6,196,932 B1 | 3/2001 | Marsh et al. | |
| 6,285,445 B1 | 9/2001 | Winfield et al. | |
| 6,289,167 B1 | 9/2001 | Boetje et al. | |
| 6,304,665 B1 | 10/2001 | Cavallaro et al. | |
| 6,320,173 B1 | 11/2001 | Vock et al. | |
| 6,389,368 B1 * | 5/2002 | Hampton | 702/179 |
| 6,396,041 B1 | 5/2002 | Vock et al. | |
| 6,398,670 B1 | 6/2002 | Engelhardt et al. | |
| 6,430,997 B1 | 8/2002 | French et al. | |
| 6,488,591 B1 | 12/2002 | Gobush et al. | |
| 6,500,073 B1 | 12/2002 | Gobush et al. | |
| 6,514,081 B1 | 2/2003 | Mengoli | |
| 6,520,864 B1 | 2/2003 | Wilk | |
| 6,539,336 B1 | 3/2003 | Vock et al. | |
| 6,567,116 B1 | 5/2003 | Aman et al. | |
| 6,569,336 B1 | 5/2003 | Mouchet et al. | |
| 6,669,571 B1 | 12/2003 | Cameron et al. | |
| 6,671,390 B1 * | 12/2003 | Barbour et al. | 382/103 |
| 6,707,487 B1 | 3/2004 | Aman et al. | |
| 6,774,345 B1 | 8/2004 | Kenk | |
| 6,774,349 B2 | 8/2004 | Vock et al. | |
| 6,778,866 B1 | 8/2004 | Bettwy | |
| 6,781,621 B1 | 8/2004 | Gobush et al. | |
| 6,816,185 B2 | 11/2004 | Harmath | |
| 6,839,771 B1 | 1/2005 | Bouchier et al. | |
| 7,094,164 B2 | 8/2006 | Marty et al. | |
| 7,101,287 B1 * | 9/2006 | Wagner | 473/207 |
| 7,214,138 B1 | 5/2007 | Stivers et al. | |
| 7,264,554 B2 | 9/2007 | Bentley | |
| 7,658,676 B2 | 2/2010 | Ohta | |
| 7,850,552 B2 | 12/2010 | Marty et al. | |
| 7,854,669 B2 | 12/2010 | Marty et al. | |
| 7,899,307 B1 | 3/2011 | Hughes | |
| 8,016,688 B2 | 9/2011 | Gobush | |
| 8,083,617 B2 | 12/2011 | Greenquist et al. | |
| 8,622,832 B2 | 1/2014 | Marty et al. | |
| 2001/0023209 A1 | 9/2001 | Yamamoto | |
| 2002/0098898 A1 | 7/2002 | Manwaring | |
| 2002/0119841 A1 | 8/2002 | Foley | |
| 2002/0155896 A1 | 10/2002 | Gobush et al. | |
| 2002/0173367 A1 | 11/2002 | Gobush et al. | |
| 2003/0054905 A1 | 3/2003 | King, Jr. | |
| 2003/0073518 A1 | 4/2003 | Marty et al. | |
| 2003/0109322 A1 | 6/2003 | Funk et al. | |
| 2003/0207718 A1 | 11/2003 | Perlmutter | |
| 2004/0155962 A1 | 8/2004 | Marks | |
| 2005/0012023 A1 | 1/2005 | Vock et al. | |
| 2005/0215338 A1 | 9/2005 | Miyamoto | |
| 2005/0223799 A1 | 10/2005 | Murphy | |
| 2005/0233815 A1 | 10/2005 | McCreary et al. | |
| 2006/0100016 A1 | 5/2006 | Hamano et al. | |
| 2006/0105857 A1 | 5/2006 | Stark | |
| 2006/0135297 A1 | 6/2006 | Cruciani | |
| 2006/0189386 A1 | 8/2006 | Rosenberg | |
| 2007/0026974 A1 | 2/2007 | Marty et al. | |
| 2007/0026975 A1 | 2/2007 | Marty et al. | |
| 2007/0129180 A1 | 6/2007 | Levy | |
| 2007/0167247 A1 | 7/2007 | Lindsay | |
| 2007/0167266 A1 | 7/2007 | Devall | |
| 2007/0275787 A1 | 11/2007 | Bouchard et al. | |
| 2008/0015061 A1 | 1/2008 | Klein | |
| 2008/0200287 A1 * | 8/2008 | Marty et al. | 473/459 |
| 2008/0268943 A1 | 10/2008 | Jacob | |
| 2010/0267443 A1 | 10/2010 | Shimamura et al. | |
| 2012/0142416 A1 | 6/2012 | Joutras | |
| 2012/0172126 A1 | 7/2012 | Padovani et al. | |
| 2012/0214594 A1 | 8/2012 | Kirovski et al. | |
| 2012/0225719 A1 | 9/2012 | Nowozin et al. | |
| 2012/0258804 A1 | 10/2012 | Ahmed | |
| 2013/0095959 A1 | 4/2013 | Marty et al. | |
| 2013/0095960 A9 | 4/2013 | Marty et al. | |
| 2013/0095961 A1 | 4/2013 | Marty et al. | |
| 2013/0172058 A1 | 7/2013 | Marty et al. | |
| 2014/0092253 A1 | 4/2014 | Marty et al. | |
| 2014/0156042 A1 | 6/2014 | Marty et al. | |
| 2014/0180451 A1 * | 6/2014 | Marty | 700/91 |

FOREIGN PATENT DOCUMENTS

| | | |
|---|---|---|
| WO | WO 98/24242 | 6/1998 |
| WO | WO 01/54781 | 2/2001 |
| WO | WO 01/38898 | 5/2001 |

(56) References Cited

FOREIGN PATENT DOCUMENTS

OTHER PUBLICATIONS

Office Action dated Jun. 10, 2010 in U.S. Appl. No. 11/507,886.
Silverberg et al., "Numerical Analysis of the Basketball Shot," Journal of Dynamic Systems, Measurement and Control, Dec. 2003, vol. 125, pp. 531-540.
Tran, "Optimal release conditions for the free throw in men's basketball," Journal of Sports Sciences, Sep. 2008; 26(11): 1147-1155.
Okubo et al., "Dynamics of basketball-rim interactions," Sports Engineering, (2004) 7, pp. 15-29.
Okubo et al., "Effects of basketball free throw release conditions using a dynamic model," The Engineering of Sport 5, vol. 1, 372-378, Central Plain Book Mfg., 2004.
Okubo et al., "Dynamics of basketball-rim interactions," The Engineering of Sport: 4, Blackwell Science, Oxford, 2002, pp. 660-666.
Okubo et al., "Strategies for Bank Shots and Direct Shots in Basketball," The Engineering of Sport: 6, vol. 3, Springer, New York, 2006, pp. 233-248.
Okubo et al., "Dynamics of the basketball shot with application to the free throw," Journal of Sports Sciences, Dec. 2006; 24(12): 1303-1314.
Notice of Allowance and Allowed claims mailed Apr. 5, 2006 from U.S. Appl. No. 10/242,373, 21 pgs.
Hawk-Eye-Wikipedia, the free encyclopedia http://en.wikipedia.org/wiki/HawkEye, printed Jan. 10, 2008, pp. 1-4.
U.S. Office Action dated Oct. 3, 2011 from U.S. Appl. No. 11/972,553.
U.S. Office Action dated Jan. 11, 2012 from U.S. Appl. No. 12/127,744.
U.S. Office Action dated Jan. 26, 2012 from U.S. Appl. No. 12/015,445.
U.S. Final Office Action dated Mar. 21, 2012 from U.S. Appl. No. 12/127,744.
U.S. Final Office Action dated Dec. 13, 2012 from U.S. Appl. No. 11/972,553.
U.S. Office Action dated Jan. 4, 2013 from U.S. Appl. No. 12/015,445.
"U.S. Appl. No. 13/693,918, Non Final Office Action mailed Sep. 23, 2013".
"U.S. Appl. No. 13/693,918, Restriction Requirement mailed May 17, 2013".
Brancazio, Peter J., "Physics of basketball", Am.J. Phys. vol. 49. No. 4, Apr. 1981, Department of Physics, Brooklyn College, City University of New York, Apr. 1981, 356-365.
Mullaney, Dave, "Free Throw Technique", The Athletic Journal for Nov. 1957, 53-55.
"U.S. Appl. No. 12/966,301, Examiner Interview Summary mailed Jul. 30, 2013".
"U.S. Appl. No. 12/966,301, Final Office Action mailed Jun. 19, 2013".
"U.S. Appl. No. 12/966,301, Notice of Allowance mailed Sep. 4, 2013".
"U.S. Appl. No. 13/693,918, Examiner Interview Summary mailed Nov. 6, 2013".
"U.S. Appl. No. 13/693,918, Notice of Allowance mailed Nov. 25, 2013", 7 pgs.

\* cited by examiner

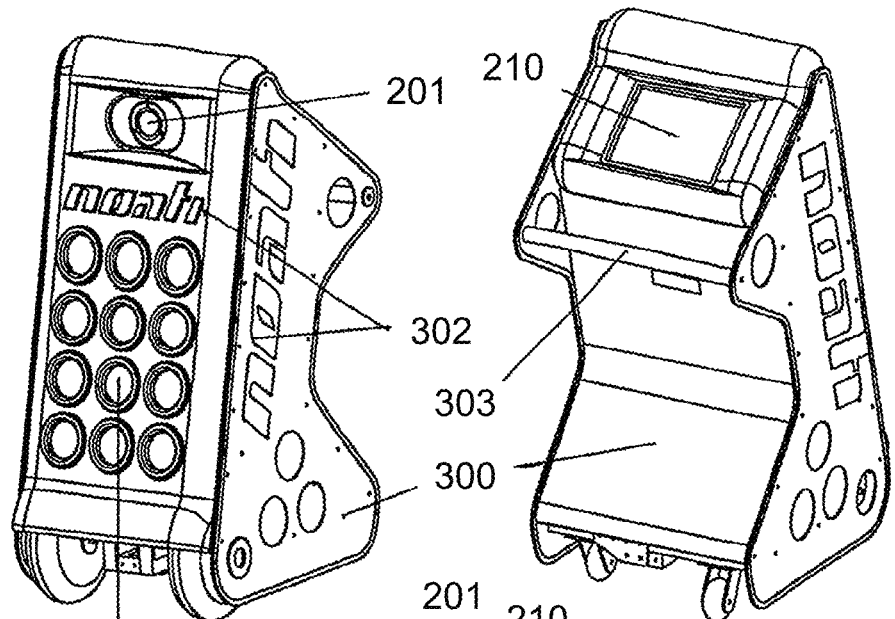
Figure 7A
Figure 7B
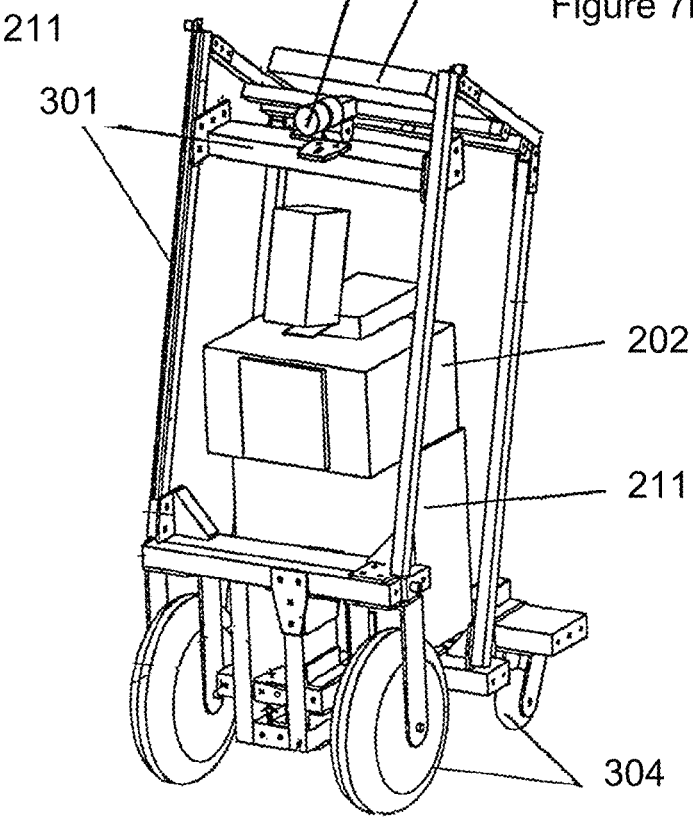
Figure 7C

TRAJECTORY DETECTION AND FEEDBACK SYSTEM FOR TENNIS

CROSS-REFERENCE TO RELATED APPLICATIONS

This application claims priority under 35 U.S.C. §120 and is a Continuation of co-pending U.S. patent application Ser. No. 12/015,445, filed Jan. 16, 2008, which claims priority under 35 U.S.C. §119(e) to U.S. Provisional Patent Application No. 60/880,773, filed on Jan. 16, 2007. U.S. patent application Ser. No. 12/015,445 further claims priority under 35 U.S.C. §120 and is a Continuation-in-Part application of U.S. patent application Ser. No. 11/508,004, filed Aug. 21, 2006, now U.S. Pat. No. 7,854,669, which is a Continuation-in-Part and claims priority under 35 U.S.C. §120 to U.S. patent application Ser. No. 10/242,373, filed Sep. 11, 2002, now U.S. Pat. No. 7,094,164. U.S. patent application Ser. No. 10/242,373 claims priority under 35 U.S.C. §119(e) from the following three U.S. Provisional Patent Applications 60/323,029, filed Sep. 12, 2001; 60/348,057, filed Jan. 11, 2002; and 60/395,875 filed Jul. 12, 2002. Each of the above provisional and non-provisional applications are incorporated herein by reference in their entirety.

TECHNICAL FIELD

The present invention relates generally to devices and systems for sports training and entertainment and more specifically to a trajectory detection and feed back systems and associated methods for tennis.

BACKGROUND

In regards to tennis, there is a lack of training devices that allow for tennis players to train muscle memory for the tennis serve, volleys or ground strokes on-court or off-court in a manner that is measurable and repeatable. For example, there are no simple, non-intrusive, cost effective ways for tennis players to know whether their practice serves, volleys or ground strokes are being correctly reproduced during matches, to measure muscle memory consistency in their serves, volleys and ground strokes when ball results are impacted by wind, temperature, humidity, ball type/age, altitude, etc. or to keep track of their serve, volley or ground stroke accuracy over many different training and playing sessions. Further, for players that enjoy games or are motivated by competition, there are no simple, non-intrusive, cost effective ways to compete with themselves or with each other in one location or with each other in multiple locations while using their own unmodified racquets and unmodified ball in a normal tennis environment (court), such as within the context of video game utilizing data measured during their actual game play. In the following paragraphs, system, apparatus and method that may satisfy the issues described above are described.

SUMMARY

A system for capturing and analyzing a trajectory of a tennis ball or other object associated with a play of a game of tennis and providing feedback is described. The system may be designed to capture and analyze a trajectory of a tennis ball during various activities related to the play of a game of tennis including serves and ground-strokes. The system may be configured to provide immediate feedback that may be utilized by a player to improve their performance as well as provide entertainment value above and beyond what is normally associated with the play of a game of tennis.

One aspect of the present invention relates to a device for analyzing a trajectory of a tennis ball. The device may be characterized as comprising: 1) one or more cameras for recording video frame data used to characterize a trajectory of a tennis ball generated by a player during a tennis related activity; 2) a logic device designed or configured to i) receive the video frame data, ii) identify the tennis ball in the video frame data, iii) generate trajectory parameters that characterize one or more states of the tennis ball along its trajectory and iv) generate feedback information using the trajectory parameters; and 3) at least one output mechanism for providing the feedback information to the player in real-time. In particular embodiments, the device may include two cameras or a stereoscopic camera. These cameras may be utilized as part of a machine vision system.

The tennis related activity may be a toss of the tennis ball for a serve and where the logic device is further designed or configured to determine the trajectory of the tennis ball during the toss and prior to impact with a racquet. The feedback information may be related to the trajectory of the tennis ball during the toss. In addition, the logic device may be further designed or configured to determine the trajectory of the tennis ball after impact with the racquet where the feedback information is related to the trajectory of tennis ball after the impact of the racquet. Further, the feedback information may include information related to the trajectory of the tennis ball during the toss and may include information related to the trajectory of the tennis ball after impact with the racquet. In other example, the activity associated with the game of tennis may be a ground-stroke and where the logic device is further designed or configured to determine one or more of the trajectory of the tennis ball prior to impact with a racquet, the trajectory of the tennis ball during impact with the racquet, the trajectory of the tennis ball after impact with the racquet or combinations thereof and to provide feedback information related to one or more of the trajectories.

The feedback information may be derived from a simulated trajectory of the tennis ball or may be directly measured by the device. In particular embodiments, the feedback information may include one or more of the following 1) a height of a serve toss, 2) a lean of the serve toss, 3) a spin of the serve toss, 4) a consistency of a plurality of serve tosses, 5) an impact position height of a serve, 6) an impact position lean of the serve, 7) a consistency of an impact position of a plurality of serves, 8) an initial speed of the serve, 9) an initial angle of the serve, 10) an initial direction of the serve, 11) an initial spin of the serve, 12) a consistency of the initial speed of the plurality of serves, 13) a consistency of the angle of serve of the plurality of serves, 14) a consistency of the direction of the plurality of serves, 15) a consistency of the spin of the plurality of serves, 16) a calculated speed of the serve, 17) a consistency of the calculated speed of the plurality of serves, 18) a calculated landing speed of the serve, 19) a location of the serve at landing, 20) a spin of the serve at landing, 21) a direction vector of the serve at landing, 22) a consistency of the calculated landing speed for the plurality of serves, 23) a consistency of the location at landing of the plurality of server, 24) a consistency of the spin at landing of the plurality of serves, 25) a consistency of the direction vector of the plurality of serves, 26) a measured landing speed of the serve, 27) a measured location of the serve, 28) a measured spin of the serve, 29) a measured direction vector of the serve, 30) a consistency of the measured landing speed of the plurality of serves, 31) a consistency of the measured location of the plurality of serves, 32) a consistency of the spin measured for the plurality of serves, 33) a consistency of the direction vector measured for the plurality of serves, 34) a height above or below a net of the tennis ball, 35) a location of the crossing point of the net of the tennis ball, 36) a release location of the serve toss and 37) combinations thereof.

In other embodiments, the activity associated with the game of tennis may be a ground-stroke and where the logic device is further designed or configured to determine one or more of the trajectory of the tennis ball prior to impact with a racquet, the trajectory of the tennis ball during impact with the racquet, the trajectory of the tennis ball after impact with the racquet or combinations thereof and to provide feedback information related to one or more of the trajectories. The logic device may be further designed or configured to identify a boundary line associated with a tennis court in the video frame data where the logic device is further designed or configured to determine a position of the device relative to the tennis court using information associated with the identified boundary line for calibration purposes. In addition, the logic device is further designed or configured to determine the position of the tennis ball relative to the boundary line.

In yet other embodiments, the logic device may be further designed or configured to identify a position of a body element of the player participating in the tennis related activity in the video frame data and to determine the position of the body element relative to the boundary line. Further, the logic device may be further designed or configured to identify a net associated with a tennis court including an upper edge of said net in the video frame data. A position of the device relative to the net may be utilized for calibration purposes. In addition, the logic device may be further designed or configured to determine a position of the tennis ball relative to the upper edge of said net.

In some instances, the logic device may be further designed or configured to determine whether a tennis ball hit by a player on a tennis court is inside of or outside of one or more boundary lines associated with the tennis court. Also, the logic device may be further designed or configured to output feedback information to the player indicating whether the tennis ball is insider or outside of the one or more boundary lines with the feedback information generated using the trajectory parameters or at least store this information.

The logic device may further designed or configured to determine the trajectory parameters associated with a two-dimensional trajectory for the tennis ball or to determine the trajectory parameters associated with a three-dimensional trajectory for the tennis ball. The logic device may be further designed or configured to determine one or more of a spin rate, a spin direction or combinations thereof of the tennis ball for at least one point along its trajectory. Further, the logic device is may be designed or configured to identify a racquet in the video frame data and to determine a position of the racquet, a velocity of the racquet, an orientation of the racquet as a function of time or combinations thereof as a function of time. Also, the logic device may be designed or configured to identify a body element of the player participating in the tennis related activity in the video frame data and to determine a position of the body element, an orientation of the body element, a velocity of the body element or combinations thereof, as a function of time and to provide feedback information related to one or more of the position of the body element, the orientation of the body element or the velocity of the body element to a user.

The device may comprise one or more sensors for determining an orientation of the device where the one or more sensors may comprise accelerometers or tilt sensors. These sensors may be utilized during calibration of the device. The logic device may be designed or configured to determine, for the purposes of calibration, a distance from the device to one or more of the tennis ball, a racquet, a boundary line on the tennis court, a net on the tennis court, a vertical surface against which the tennis ball is being hit or a player hitting the tennis ball.

In further embodiments, the output mechanism may be a wireless interface for outputting the feedback information to one or more remote devices where the remote device may be worn by a player participating in the activity associated with game of tennis. The device may be operable to output feedback information to a plurality of player simultaneously, such as a player hitting a serve and a player receiving a serve. In another embodiment, the output mechanism may be an audio device coupled to a display.

The device may comprise a housing for the one or more cameras, the logic device, and the at least one output mechanism. The housing may have a weight and a form factor, which facilitate one or more of transport, storage, unobtrusive set-up, calibration, or operation of the device. A portion of the housing may comprise a bag. The device may be portable. For instance, the device may include wheels that allow the device to pulled or pushed by a user along the ground or handle that allows the device to be carried. The device may include an input mechanism. The input mechanism may be a touch screen display. The input mechanism may be a wireless interface for receiving input from a remote device.

The logic device may be a general purpose computer comprising one or more of a processor, a data storage device, RAM, operating system software, device interfaces, device drivers, trajectory analysis software, machine vision software and combinations thereof. The memory storage device may be for storing trajectory session information wherein the trajectory session information comprises one or more of 1) digitized video frame data, trajectory information and feedback information generated for a plurality of trajectories, 2) a trajectory session time, 3) a trajectory session date, 4) a trajectory session location or combinations thereof. The logic device may be further designed or configured to store data related to one or the trajectory of the tennis ball, movements of the player, movements of a racquet captured in the video frame data for use in a video simulation related to tennis where the video simulation of the player is generated using the stored data.

The device may be capable of one of autonomous set-up, autonomous calibration, autonomous operation or combinations thereof. In some instances, after manual input of data by a user, a confirmation of data determined by the device, the logic device is further designed or configured to complete a calibration procedure. The device may be designed to determine for a plurality of related trajectories captured by the device a consistency for at least one of the trajectory parameters generated for each of the plurality of related trajectories where the consistency may be determined by calculating a statistical deviation.

Another aspect of the present invention is related to a device for analyzing a trajectory of a tennis ball. The device may be generally characterized as comprising: 1) one or more cameras for recording video frame data used to characterize a trajectory of a tennis ball generated by a player during a tennis related activity; 2) a logic device designed or configured to i) receive the video frame data, ii) to identify the tennis ball in the video frame data, iii) generate trajectory parameters that characterize one or more states of the tennis ball along its trajectory and iv) generate feedback information using the trajectory parameters; and 3) at least one output mechanism for providing the feedback information to the player in real-time; 4) a housing supporting or enclosing the one or more cameras, a logic device, and the at least the output mechanism wherein the housing and components supported or enclosed by the housing having a form factor and a weight factor that allow the device to be carried by the player. The device may be designed to be securable to a fence by the player for operation.

Yet another aspect of the present invention is related to a device for analyzing a trajectory of a tennis ball during a serve. The device may be generally characterized as comprising: 1) one or more cameras for recording video frame data used to characterize a trajectory of a tennis ball generated by a player during a serve toss, after the tennis ball is impacted by a racquet or combinations thereof; 2) a logic device designed or configured to i) receive the video frame data, ii) identify the tennis ball in the video frame data, iii) generate trajectory parameters that characterize one or more states of the tennis ball along a) a trajectory of the serve toss, b) a trajectory after impact by the racquet or combinations thereof, and iv) generate feedback information using the trajectory parameters; and 4) at least one output mechanism for providing the feedback information to the player in real-time related to the serve.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

FIGS. 7A-7C are perspective drawings illustrating exemplary components of a trajectory detection and analysis system.

DETAILED DESCRIPTION

In the following figures, aspects of a system that captures, analyzes and provides feedback related to tennis is described. In particular, the system may be designed to capture and analyze a trajectory of a tennis ball during various activities related to the play of a game of tennis. The system may be configured to provide immediate feedback that may be utilized by a player to improve their performance as well as provide entertainment value above and beyond what is normally associated with the play of a game of tennis. The analysis and feedback system may be portable and may be operable for use in an area where tennis is normally played, such as an outdoor tennis court. Further, the system may be designed to be non-intrusive such that a player may use the system and receive feedback during normal activities associated with the play of a game of tennis. Although described primarily in regards to tennis, the system may be also be adaptable and useful for other tennis-like sports, such as but not limited to squash, racquetball, table tennis, etc.

Figure 1:
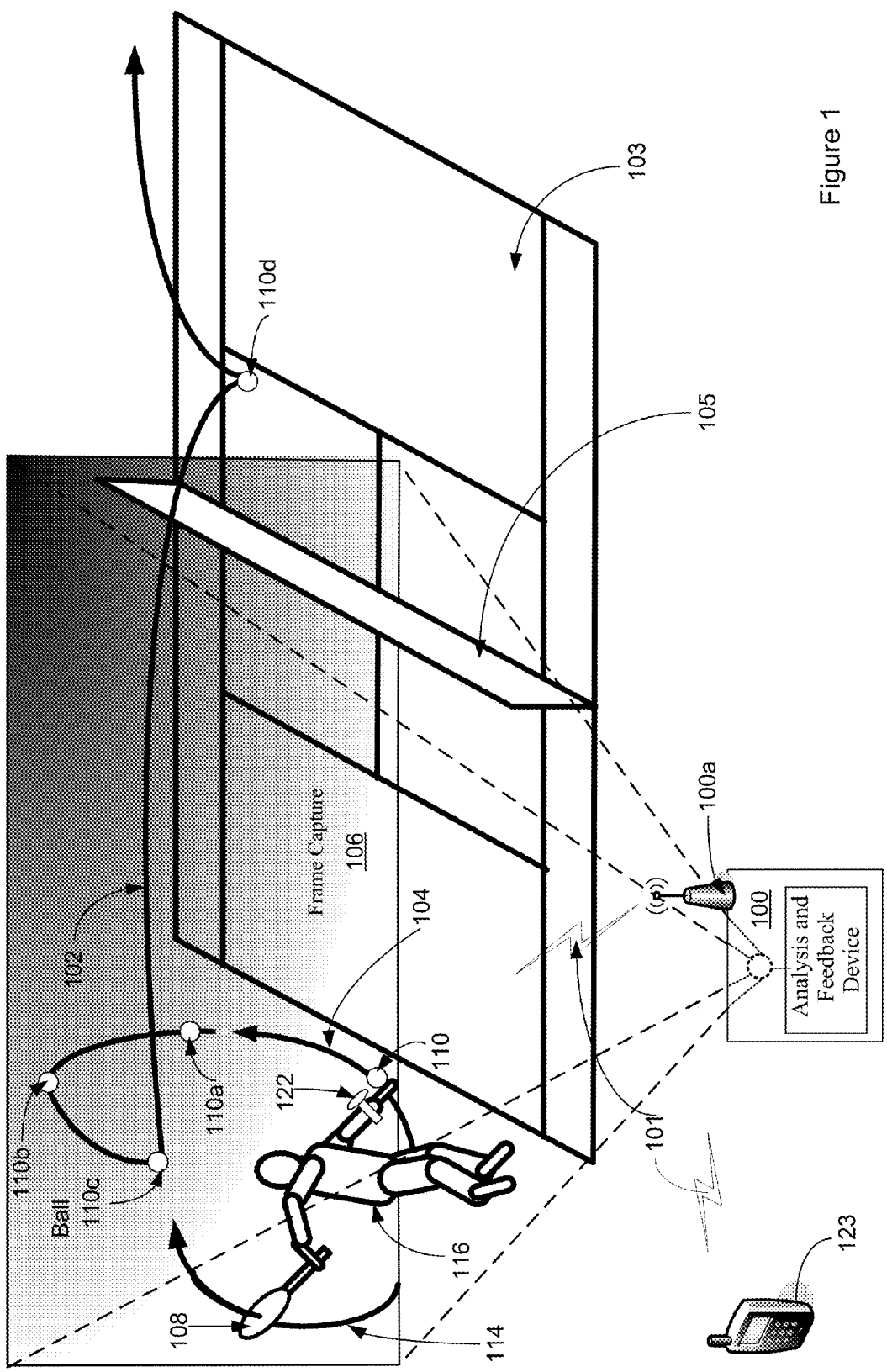
FIG. 1 is a diagram illustrating an in-situ use of trajectory detection and analysis system for tennis.
Figure 2:
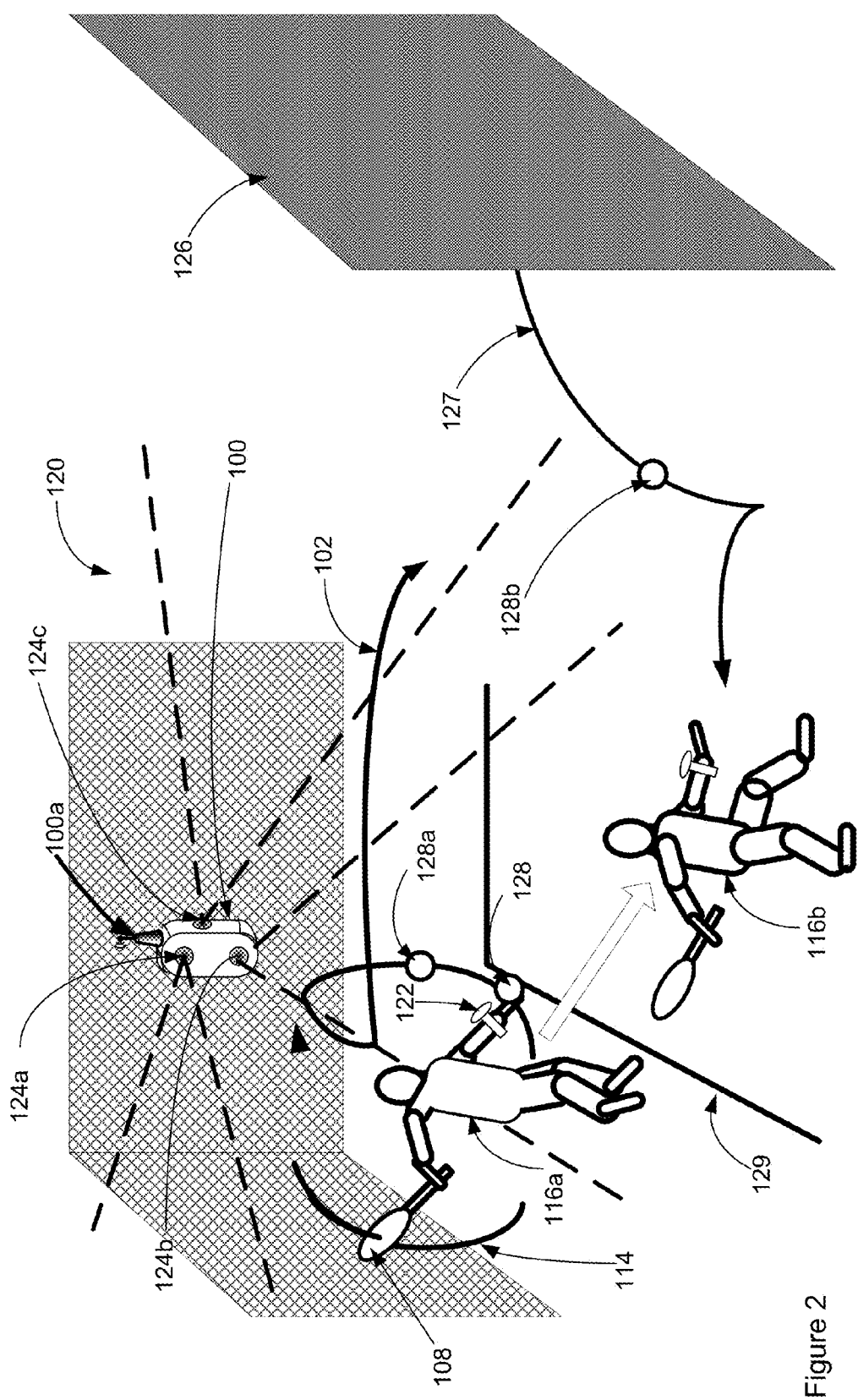
FIG. 2 is a perspective view illustrating a use of a trajectory detection and analysis system for tennis.
Figure 8:
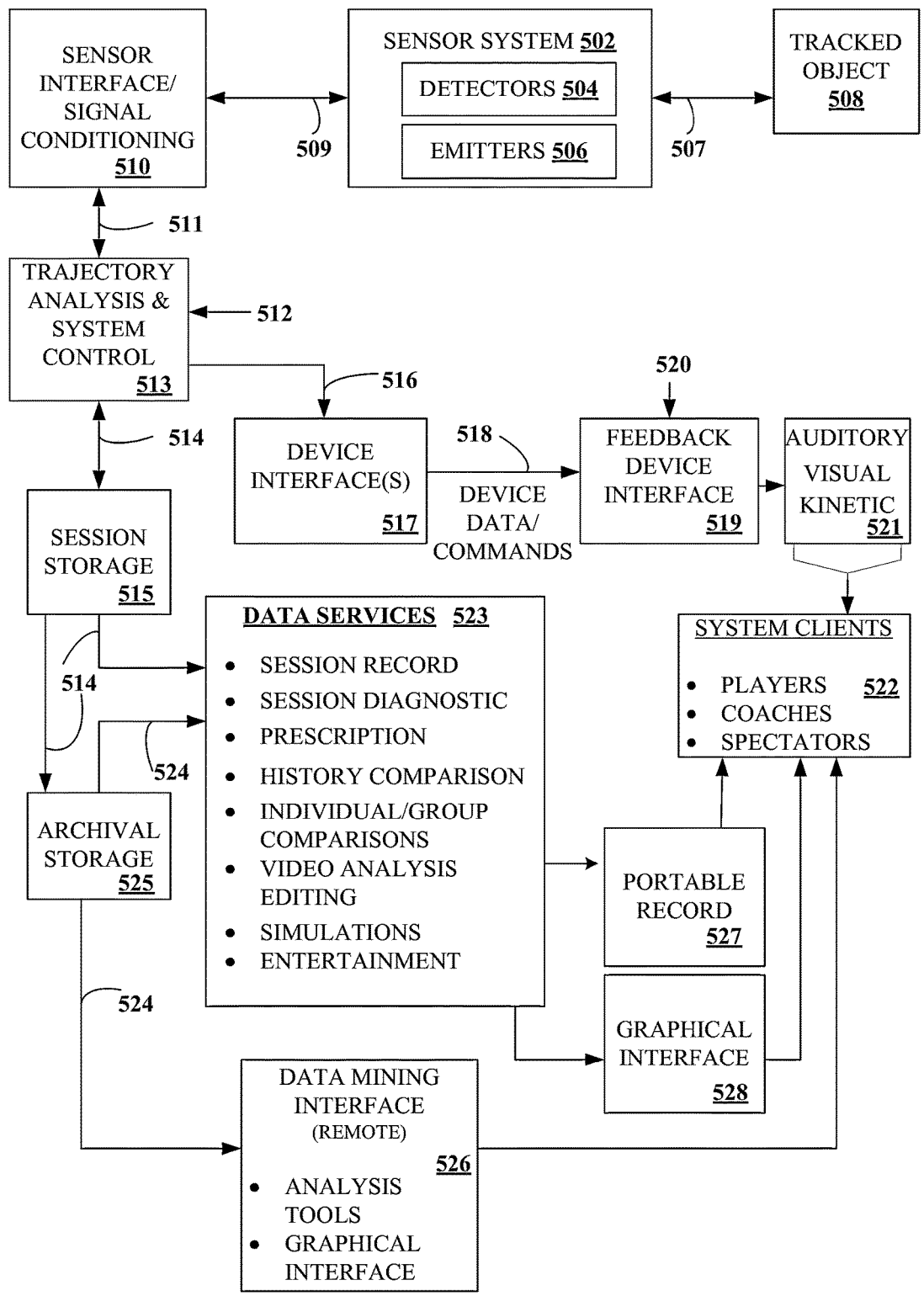
FIG. 8 is an information flow diagram for exemplary components of a trajectory detection and analysis system.

With respect to FIGS. 1 and 2, an in-situ use of a trajectory detection and analysis system for tennis is described. With respect to FIG. 3, a wearable feedback device is described. With respect to FIGS. 4 and 5, interface screens related to performance analysis are discussed. With respect to FIGS. 6, 7 and 8, components of an analysis and feedback system are presented for the purposes of illustration.

FIG. 1 is a diagram illustrating an in-situ use of trajectory detection and analysis system for tennis. In the FIG. 1, an analysis and feedback device and associated system 100 for analyzing a trajectory associated with the play of tennis and providing feedback may comprise one or more of the following: 1) one or more cameras (or 3D capturing sensors, such as CanestaVision™ Camera Module, Canesta, Inc., Americas Headquarters, Sunnyvale, Calif.) for recording video frame data used to characterize a trajectory (e.g., trajectory of a ball 110 along various points in its trajectory, such as at 110a, 110b, 110c and 110d), 2) a logic device (see FIGS. 6, 7A-C and 8 for more details and 3) and one or more feedback output mechanisms and associated interfaces for providing the feedback information to a user of the system (e.g., wearable device 122, cell phone 123 and wireless interface 100a). In some embodiments, the analysis feedback device may include sensors and/or an interface for measuring or inputting ambient conditions, such as temperature, humidity and wind speed.

The analysis and feedback device 100 may be designed or configured to i) receive the video frame data, ii) generate trajectory parameters that characterize one or more states of the tennis ball 110, tennis racquet 108 or a body element along its trajectory and iii) generate feedback information using the trajectory parameters. The analysis and feedback device may perform these analyzes using one or more logic devices coupled to the device 100. The analysis and feedback device 100 may be portable and may be designed to operate on or off an actual tennis court and may be self-calibrating to some extent. The device 100 may include a rechargeable energy source to power the camera(s), logic device, and/or output signal. The rechargeable energy source could be one or more of the following: battery, solar panel, fuel cell.

Some examples of trajectories captured and analyzed by the device 100, may include a trajectory 102 of a tennis ball 110 hit by a racquet 108 swung by a player 116. In further detail, the device 100 may be designed or configured to capture, analyze and provide feedback associated with but not limited to: 1) a trajectory of a tennis ball after making contact with the court (trajectory after ball 110d hits court, which would be different for a hard court, grass court or clay court), 2) a trajectory of a body element of the human while playing tennis (such as a trajectory 104 of player's 116 hand swinging racquet 108 or trajectory a player's hand tossing ball 100), 3) a trajectory of a tennis ball tossed by the player 116 (e.g., along trajectory including 110a, 110b and 110c), 4) a trajectory 114 of a section of the racquet face or handle (which may provide, the changing angles of the racquet through the time of contact with the ball) and 5) a trajectory of a tennis ball 110 after being hit by the racquet 108, but before striking the ground, such as between trajectory points 110c and 110d.

The feedback information may be derived from measurements made by the analysis and feedback device 100. For instance, the feedback information may be related to one or more of the trajectory parameters associated with a tennis ball 110. The trajectory parameters, which may be determined by the analysis and feedback device 100 may include but are not limited to one or more of the following: 1) height of a serve toss 110b, 2) a lean of a serve toss, 3) a spin of a serve toss, 4) consistency of a serve toss and/or spin (derived from multiple serves), 5) an impact position height of a serve 110c, 6) an impact position lean of a serve, 7) a consistency of an impact position of a serve, 8) an initial speed, angle, direction and/or spin of a serve, 9) consistency of initial speed, angle, direction and/or spin of a serve, 10) a calculated speed of a serve, 11) a consistency of calculated speed of a serve, 12) calculated landing speed, location 110d, spin, and/or direction vector of a serve, 13) a consistency of calculated landing speed location, spin, and/or direction vector of a serve, 14) a measured landing speed, location, spin and/or direction vector of a serve, 15) a consistency of measured landing speed, location, spin and/or direction vector of a serve, 16) a height above/below the net at crossing point of the net and/or the location of the crossing point of the net, 17) release location of a serve toss, 18) combinations thereof. Further, the system may be able to record and provide feedback related to shot outcomes, such as in or out, a shot location on the court, hit the net, whether a shot was successfully returned, etc.

Where applicable, information similar to that list listed above may be provided for any type of shot that may occur during normal tennis playing activities, such as ground strokes (forehand or backhand), overhead hits, volleys, service returns, etc. For example, the system may be designed or configured to provide feedback and store information related to an impact position height of a stroke, a shot velocity or spin velocity as it leaves the racquet, a consistency of a stroke parameter (such as racquet head speed) and shot results (such as in or out). During training, a player may attempt to hit shots to a particular location on court 103 and thus, the system may be designed or configured to provide a consistency/variability associated with shot placement.

The feedback information provided to a player may be related to one or more parts of a trajectory. For instance, at one time a player may wish to receive feedback information regarding their toss 110a-110c, at another time a player may wish to receive feedback information regarding their serve speed and impact height (e.g., height at 110c), which corresponds to the trajectory of the ball after it is tossed, at other times the player may wish to receive feedback information regarding the location where the ball lands (e.g., 110d), which is the later in the trajectory 102. The analysis and feedback device 123 may be operable to provide feedback information for one or more parts of the trajectory simultaneously. For instance, the device may provide an audible, such as "7, 100, in," which may correspond to a serve height of 7 feet, a serve speed of 100 miles per hour and an indication that it landed in. The analysis and feedback device may provide an interface that allows the user to select what type of feedback information they wish to receive, such as a combination of feedback parameters. In one embodiment, the feedback information may be provided to a wearable device 122 via wireless signals 101 from wireless interface 100a.

The device may further include an interface that may provide recommendations for feedback information to output depending on what goal a player is trying to accomplish, such as increasing speed or increasing accuracy, and possibly based upon a training regimen that a player is currently utilizing. For instance, feedback information to improve a serve may comprise mastering two or more skills, requiring two types of feedback information. Thus, when the player is mastering the first skill, the device may provide feedback information of a first type associated with the first skill. After the player has mastered the first skill, the device may provide feedback information of a second type associated with the second skill but still monitor the feedback information associated with the first skill. Thus, the device may be operable to notify the player, when after progressing to the second skill, if the device notices the player has started slipping in their mastery of the first skill.

In addition to providing feedback information to a player generating a particular shot, feedback information of a shot may be provided to a player receiving a shot. For example, parameters related to a racquet head speed or movement (e.g., movement of racquet 108 along trajectory 114) and then resultant serve speed and/or direction may be provided to a player receiving a serve. The information may or may not be provided simultaneously to the player making the serve. This feedback information or other combinations of feedback information associated with the serve may be useful in helping a player learn to return serves. For instance, feedback information associated with a racquet movement or other body movement of a player making a server may help the player to learn how to judge a speed and/or direction of the resultant serve and hence, help them to anticipate and react to serves.

In the preceding paragraph listing the trajectory parameters, any of the trajectory parameters may be normalized or modified in some manner to allow for comparisons, such as comparisons between sessions or between players. Some factors that may be considered in a normalization process may include but are not limited to ambient conditions, such as wind speed, temperature and humidity, physical characteristic of a player, such as sex, weight, age and height and skill level of a player. Normalizations involving ambient conditions may allow training sessions carried out under different training sessions to be more accurately compared. Normalizations involving physical characteristics may allow performances from players with different physical characteristics to be compared. Normalizations involving skill level may allow players of differing skill levels to compete against one another, akin to providing a handicap in golf.

In particular embodiments, the analysis and feedback device or an associated input device may be operable to allow data used for normalizations to be entered. In addition, the analysis and feedback device may be operable to measure one or more of these normalization inputs. For example, the analysis and feedback device 100 or an input device associated with the system (e.g., 122 or 123 or see FIGS. 6, 7A-C and 8 for more details) may be operable to measure an ambient temperature and/or humidity that may be used to provide normalizations for comparisons between training sessions.

In addition, the analysis and feedback device may also measure and may provide feedback on other tennis parameters related to one or more of the following: racquet head movement (e.g., 114), racquet head orientation, racquet head impact point, a lower body movement, upper body movement, feet position, such as foot fault, etc. The analysis and feedback device may associate and/or analyze these parameters as they relate to the ball trajectory results. The device may measure and provide feedback on consistency of these parameters with the same service type or across a series of service types (as well as with other stroke types). The device may also include an interface and analysis capability that allows a heart rate of the tennis player to be determined and provide feedback or analysis of this heart rate. This analysis may be provided in conjunction/combination with other feedback information, such as heart rate while serving or heart rate during good serves as compared to bad serves, etc.

The analysis and feedback device may also be operable to store the measurement of the parameters for later review, upload, analysis, display, sharing and combinations thereof. Some of these functions may be directly available on the analysis and feedback device 100 or in combinations with other devices in a real-time or off-line manner (see FIGS. 4 and 5 for an example of an interface screen that may provide such information in an on-line or off-line manner). Further, the analysis and feedback device may be operable to make a video recording of the swing(s)/serve(s) for immediate or delayed review, analysis and/or sharing.

The analysis and feedback device 100 may be operable to gather information that it uses for calibration purposes. For example, the device may be operable to sense one or more of the following: its own position, the position of the racquet, the position of the ball, the position of the court markings and net, the position of the above relative to the others. Further that the device may be operable to self-calibrate one or more of its functions while accounting for one or more of the following parameters: ball position, tennis player position, tennis racquet position, device position (its position), tilt of device, lighting, wind, humidity, type of racquet, brand of racquet, type of ball, identity of tennis player, altitude. The analysis and feedback device may include one or more sensors that allow it to determine its orientation, such as accelerometers or tilt sensors. For instance, device 100 may be operable to determine its orientation relative to a horizontal surface.

Each time, the device is used it may be placed in a different position. For example, it may be hung on a fence in a different location/orientation or placed in a different position on a playing surface, such as a tennis court. During use of the device, a user may wish to move the device 100 to a different location, which may require a recalibration of the device 100. As another example, while hung on the fence, a user may bump into it and change its orientation, in which case, the device 100 may recalibrate itself. As another example, the user may take a break and simply turn off the device and later return and power-on the device, in which case a calibration may be performed. In one embodiment, the device may store its last or previous calibration settings and may use those as a starting point or may allow the user to select a calibration setting that was previously generated to speed up the calibration process.

In some embodiments, the device 100 may be operable to automatically recalibrate itself or at least check its calibration on a periodic basis. In some instances, the recalibration may be initiated when the device is operable to detect whether it has been moved or bumped. For example, the device 100 may include sensors for detecting a movement of the device, such as accelerometers. In other instances, a calibration procedure may be initiated when a device is first turned on. It yet other embodiments, the calibration procedure may be initiated manually via input by a user.

In one embodiment, the calibration procedure may involve a manual confirmation of some data by the user. For instance, the device 100 may determine whether it is level or not and then electronically adjust its orientation, i.e., its frame capture capabilities, such that they are level with a playing surface, such as tennis court. Thus, the device 100 even though may be tilted in some manner, the captured frame data will appear correctly orientated relative to the ground when later viewed. Next, the device may attempt to identify some object on the playing surface, such as a boundary line, a net, a cone, a ball or a tennis racquet placed on the playing surface or a target placed on the playing surface. The dimensions of the boundary line or boundary lines, cone or target may or may not be known to the device 100 and the device 100 may be operable to determine the size of the object.

In some instances, the calibration procedure may require an object or target to be placed a certain distance from the device or the distance from the cone or target may be input by the user. Also, the size of the object or the target may be optionally input by the user. If the device is placed on a playing surface with boundary lines, such as a tennis court of known dimensions, then inputting a distance or placing an object at a known distance may not be necessary. Nevertheless, in some embodiments, the device 100 may be configured to request a confirmation that an object or a location on the playing surface, such as a baseline corner or a service box corner, is correctly identified by the device 100. After a confirmation by the user or, as described above, a manual input of some information by the user, the device 100 may be configured to autonomously complete the calibration procedure and continue to a state where it is ready for trajectory capture. In some embodiments, the calibration procedure may be completely autonomous and a confirmation by the user or manual input by the user may not be utilized.

The analysis and feedback device 100 may include or may be coupled to a device that provides an interface for inputting for parameters, such as type of racquet, type of ball, age of ball and ambient conditions, such as the weather. Using racquet information, the system may be operable to determine a location where a ball hits the racquet and compare it with a known "sweet spot" for the racquet.

The analysis and feedback device may be operable to output data in a number of formats that enhance a training experience in conjunction with the device and/or that provide entertainment value. For instance, the measured parameter(s) may be compiled into score(s), allowing the player to track and share improvement in score. As another example, the scores may be shared in a real time or delayed fashion over a medium such as the Internet or a cellular network, in a manner that allows the players to compete with each other. Further, the scores or information output from the device may allow observation and scoring to be provided to the player(s) or audience(s) for purposes of entertainment, payment, and/or teaching.

The analysis and feedback device may be operable to measure trajectory parameter at numerous locations along a trajectory, such as from toss, to impact, to landing and bounce as shown in FIG. 1 for a server. For example, the device may be able to measure the resulting location where the serve first landed 110d, such as in the opposite court. This location may be recorded simply as serve in or serve out, which may also be provided as feedback to the player. Further, the location could also designate the exact point that the serve hit the court or whether the serve hit a designated target space within the service box. It may or may not be necessary to add additional cameras to the device to achieve this measurement of resulting serve location. In one implementation, a second set of stereo cameras would be added to the device to view the court on the other side of the net from the server.

Additional details of an implementation of analysis and feedback device and/or system for tennis is described as follows for the purposes of explanation and is not meant to be limiting. FIG. 2 is a perspective view illustrating a use of a trajectory detection and analysis system for tennis. In FIG. 2, device 100 may be a custom tennis racquet bag containing a stereo camera consisting of top camera 124a and bottom camera 124b. The bag may also contain the logic device that receives the frames, generates the trajectory information and generates a wireless signal via wireless interface 100a with initial ball impact height, initial ball speed and initial ball angle. Wireless signal may be received by a wearable device 122, which may display feedback information, such as serve type, ball impact height, ball initial speed and ball initial angle (see FIG. 3 for more detail). The device may also be operable to output this information in an audio format. In some embodiments, the wearable device may also be used as an input device.

In particular embodiments, the wearable device may store information regarding a series of shots that can later be downloaded to a computer and can be uploaded onto the Internet, if desired. Thus, the device may include a memory unit, such as flash memory or a small hard-drive. In some embodiments, the device may include sensors, such as a 3-axis accelerometer and/or tilt/rotation sensors and/or GPS receiver that allow a position of the watch to be tracked. This information may be transmitted to the analysis and feedback device 100. In one embodiment, the watch may include a band or other surface that is coated with a material that allows it to be more easily tracked and discerned by cameras 124a and 124b.

The tennis racquet 108 and tennis ball 128 may be unmodified. Although, the changing angle and speed of the racquet may be useful to determining the spin, speed and direction imparted to the ball. To simplify capturing the angle and speed of the racquet, could put special marking on the head of the racquet or the strings of the racquet in order to simplify capture and computation of this information. For example, stickers, with shapes or markings of a known size and pattern, or a special marking pen may be utilized that allow the system to more easily pick out the racquet in a series of video frames.

In one example, the custom tennis racquet bag 100 may be placed on the chain link fence 120 or other object in a position approximately head high and in line with the baseline extended 129. In other embodiments, the bag 100 may include an interface that allows it be coupled to a tripod. In yet another embodiment, the bag may include telescoping legs that may be configured to extend from the bag 100 for use and then to retract into the bag for stowage.

The player 116a may select the service type to be attempted using the wearable device 122. The player may stand at the baseline in service position and hold the ball 122 in front of their body in the normal start position before the service toss. Both cameras may identify the ball allowing the logic device to calculate the distance from the bag to the ball. When the ball is identified, an LED light on the bag 100 may change from red to green signifying the device is ready for the player to hit the serve or another output device, such as an audio device may be used to indicate the device status. For instance, a speaker coupled to the bag. When the player serves, the cameras may track the trajectory of the ball during the toss, at impact point, and during the first 20 feet of the flight after racquet impact or at other points along the trajectory.

In particular embodiments, the device 100 may be operable to identify one or more objects associated with a tennis court, such as court markings and a net. Further, the device 100 may be operable to determine a relative position of one or more of a player or parts of a player to the one or more objects, such as a player's foot relative to baseline. In addition, the device 100 may be operable to determine a relative position of a tennis ball to the one or more objects, such as whether a tennis ball impacts on one side or another side of one of the court markings.

In one example, with cameras operating at 200 frames/second, a 70 mile per hour serve would be captured by each camera in 38 frames during the first 20 feet of flight:

20 ft/170 mi/hr×1 mile/5280 ft×60 min/1 hr×60 sec/1 min×200 fr/1 sec=38.8 frames Of course, this calculation will vary depending on such factors as the camera being used, the player's physical attributes, the type of shot, etc. and is not meant to be limiting. Using a single camera, the impact height, initial serve speed and initial serve direction may be calculated in 2-dimensions. Further, using a stereo camera the analysis and feedback device may calculate true speed and direction in 3-dimensions correcting for the amount the serve direction deviates from parallel to the device. The stereo camera may improve ball detection by the vision system by separating the ball from the clutter of colors and patterns in the background. The device 100 may include an additional camera 124c for further tracking of the ball 108 along its trajectory.

In particular embodiments, the device 100 may be operable to track one or more of a series of shots after the serve or a series of shots in general. For instance, player 116a may be serving to a wall 126 or to another player (not shown). Player 116a (a refers to time a and position a) may hit the serve, which may return along trajectory 127 where 128b is the tennis ball along this trajectory. The player 116b (b refers to time b and position b). The player could then hit the ball against the wall or to another person, which could also be returned. The device 100 may be operable to record each of these shots and provide feedback information, which may vary or may be the same for each shot.

In yet another embodiment, training for ground strokes and volleys may be accomplished with the use of a ball machine that provides the ball to the training player in a consistent manner. The system could provide an analysis on a series of strokes generated by the player using such a device. The feedback device may be operable to record initial trajectory parameters for the tennis ball leaving the device to factor in any inconsistencies that are due to the ball machine as opposed to the player. An instructor hitting shots to a player may also generate a series of shots that may be recorded although an instructor may not be as consistent as a ball machine.

Figure 3:
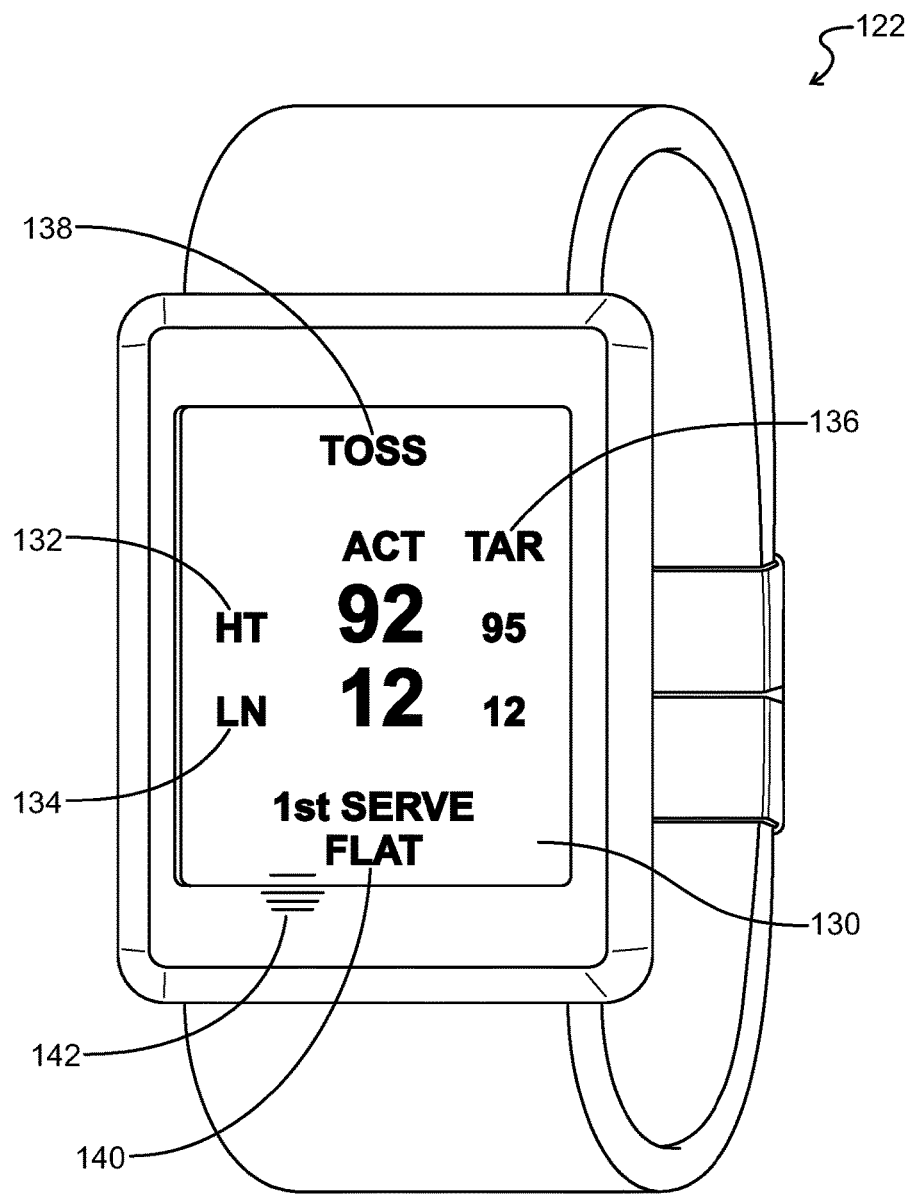
FIG. 3 is an example of a wearable feedback interface for a trajectory detection and analysis system for tennis.

FIG. 3 is an example of a wearable feedback interface for a trajectory detection and analysis system for tennis. In one embodiment, provided for illustrated purposes only, the wearable feedback device may include a "watch-like" form factor including an audio output interface 142 and a display interface 130. The display 130 could appear as shown where "1st serve flat," 140, identifies the service type, "ht," 132, refers to height at the top of the toss parabola above the court surface in inches, "ln," 134, refers to lean (the distance the ball is in front of the baseline at the top of the toss parabola), "act" refers to actual parameters that have just been measured for that serve (i.e., 92 inches and lean of 12, "tar," 136, refers to target parameters for this particular player and the type of serve that the player is trying to reproduce to build strong muscle memory.

In one implementation, the wearable device 122 may be operable to store environment, trajectory and racquet data which can be uploaded to a computer or other device connected to a network, such as the Internet. The wearable device may also be operable to store video data, associated feedback information, analysis associated with a training session, such as consistency information. The wearable may also be operable to measure and store conditions associated with a training session, such as a player's heart and/or ambient temperature and humidity. Further, the device may be operable to communicate with an audio device, such as an ear-bud worn by the player using a protocol, such as Bluetooth™.

Figure 4:
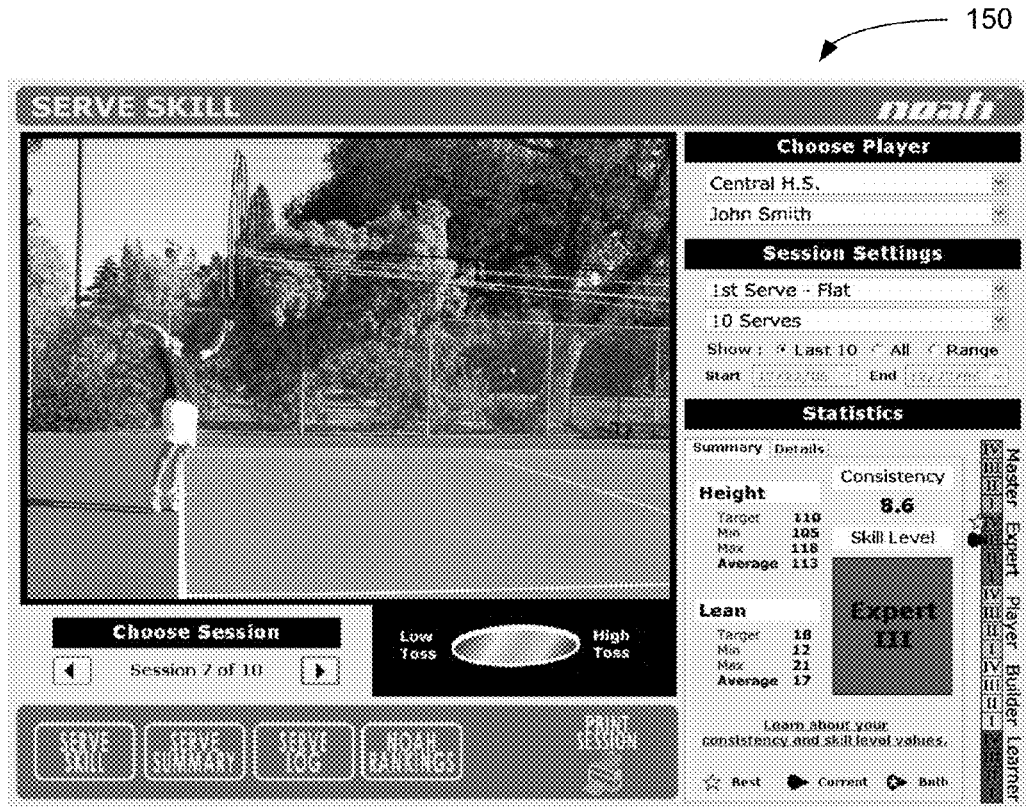
FIGS. 4 and 5 are examples of interface screens for a trajectory detection and analysis system for tennis.
Figure 5:

FIGS. 4 and 5 are examples of interface screens for a trajectory detection and analysis system for tennis. A display interface could appear as shown (In some embodiments, this display interface may be provided with the analysis and feedback device for immediate viewing or via another device, such as computer connected to the Internet for later viewing). On the interface screen, 150, "serve skill" may refer to the analysis done on the data and being presented. Further, the large frame in the screen includes the trajectory of the last 10 serves color-coded for toss height, a photo of player is in the background. "Serve Summary", "Serve Log" and "Noah Rankings" are examples of other analyses/displays available that may be selected by a user. "Print Session" allows display page to be printed (or saved) to a file. "1st serve—flat" identifies the serve type. "10 serves" identifies the number of serves analyzed. Of course, as noted above, any type of stroke associated with the play of a game of tennis may be recorded and analyzed.

In FIG. 4, "Target" may identify the personalized parameters the tennis player is trying to achieve. "Min", "Max", "Average" may display the minimum, maximum and average measurements for the 10 serves. Scale on the right hand side may identifies the skill of the player's ability to reproduce the same results with every serve, i.e., a measure of consistency. Formula may be based upon a weighted average of the standard deviation of results. "Expert III" may display the current skill level for these 10 serves as displayed on the scale.

In another example, as shown in FIG. 5, for the purposes of illustration only, the display interface 160 may appear as follows. "Attribute", "Serve Type", "Country", "State", "Time Period", "Gender" and "Age" may be selected from pull down menus where "ID" is a self-identified name for use on the system. "Speed" is an example of one trajectory parameter, in this case normalized, calculated serve speed for the ranking report in the identified categories.

As mentioned above, the feedback and analysis device may be used for training and entertainment purposes. On the court, a watch or other real time display may provide a communication link among two or more tennis players in one or more locations in real time competition connected through the Internet, cellular network or other medium while playing set games. Examples of real time games using unmodified racquets and balls may include but are not limited to:

Highest percent of 25 flat serves placed into a 2 ft×2 ft square at the back-left corner of the service box.

Highest percent of 25 kick serves placed into a 2 ft×2 ft square at the back-center corner of the service box.

Fastest flat serve out of 25 serves.

Highest consistency skill for 25 second slice serves. Device would display the skill level of all players when all have completed their 25 serve session.

Around the world game. Players need to serve into 6 designated spots on the court with a minimum of tries. Additionally, players who hit a designated spot could get an additional try in the same turn.

In one embodiment, the trajectory information may be used to create an interactive tennis game that can be played over the internet using a racquet with know parameters (weight, string taughtness, etc.) and a court with known parameters (hard, grass, clay) and maybe even a person with known skill level (as the opponent or doubles partner). Game may have similarities to current video tennis offerings, but would use real tennis racquets with full, realistic swings and maybe even a real ball (for at least the serve hit into a net).

Figure 6:
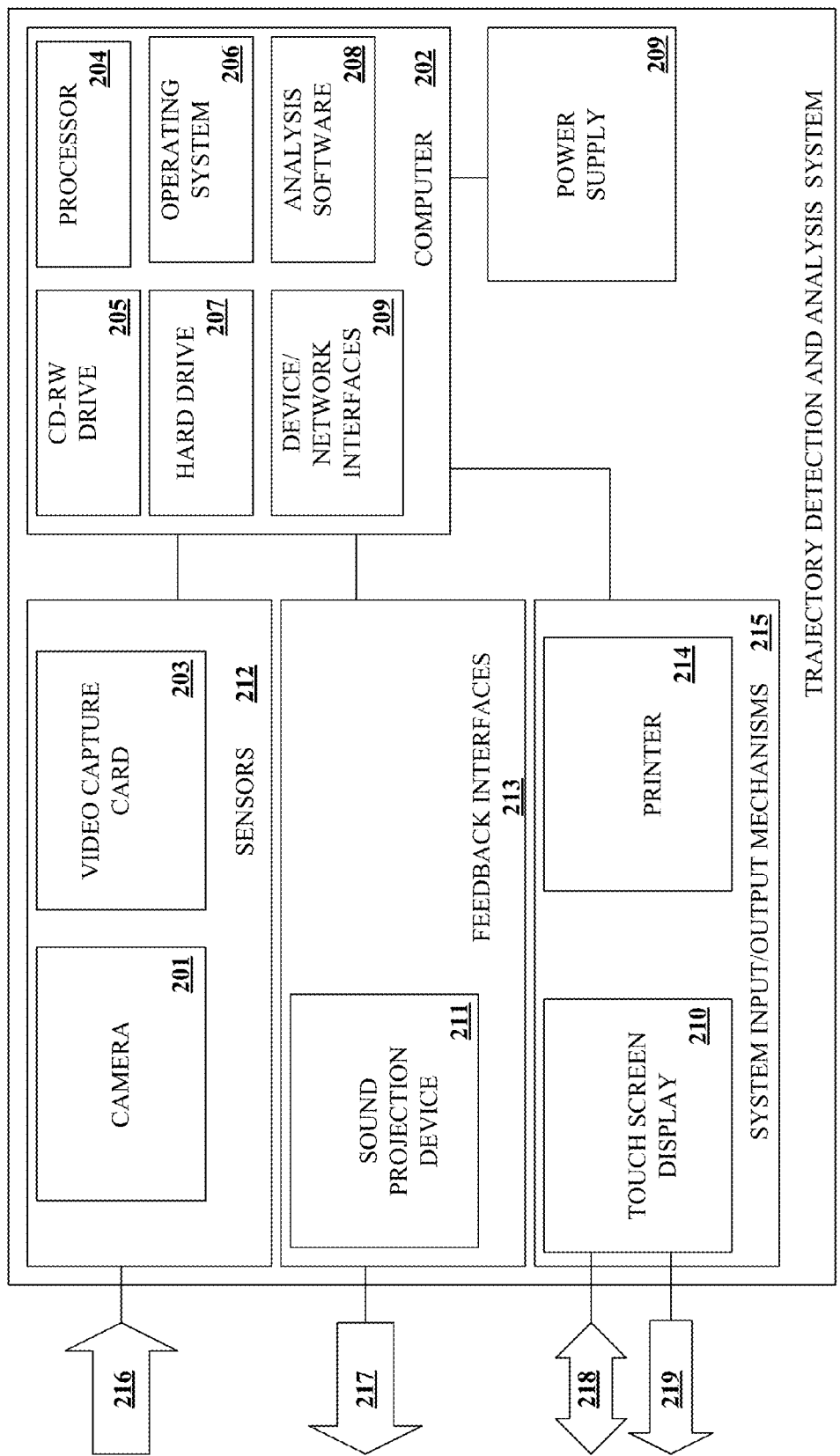
FIG. 6 is a block diagram illustrating exemplary components of a trajectory detection and analysis system.

FIG. 6 is a block diagram of a trajectory detection and analysis system 100 of the present invention. The components of the system 100 may be enclosed within a single housing or may be divided between a plurality of different housings enclosing different components of the system. Further, the system 100 may include different components that are not shown, such as the peripheral devices and remote servers.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, school, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for in-door/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone w/voice recognition software may be used to input operation information 218 into the system.

FIGS. 6A-6C are perspective drawings of exemplary components of a trajectory detection and analysis system. These figures, as well as FIGS. 5 and 7, are provided to illustrate types of components in a trajectory system and not mean to limit various form factors, combinations and/or configurations of these components. For instance, the locations, sizes and form factors of these components could look substantially different if they were integrated into a bag, as described with respect to FIG. 2. Further, every component of the system need not be included in every embodiment. For instance, the sound output device 211 may be eliminated in some designs or made substantially smaller, which could alter the form factor of the design.

In FIGS. 6A-6C, a camera 201 used in a machine vision system, a touch screen display 210, a computer 202 and a sound projection device 211 are integrated into a housing 300 with a support chassis 301. The system 100 may also include an amplifier for the speaker 211 (not shown). Further, the system 100 may include sensors for measuring ambient conditions, such as temperature, humidity and wind speed or at least include an interface for inputting information related to these environmental factors.

Wheels 304 are attached to the chassis 301 to allow the system 100 to be easily moved and positioned for use. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table or a chair. The travel system may provide feedback information via a wireless communication interface to audio device, such as an "earbud," worn by the player or wearable feed back device described with respect to FIG. 3. In another embodiment, the travel system may generate output signals that may be routed through a portable audio system (e.g., a boom box) for amplification via speakers on the audio system to provide feedback information.

FIG. 7 is an information flow diagram for a trajectory detection and analysis system of the present invention. A sensor system 502, which may comprise emitters 506 and detectors 506, receives physical information 507. The physical information 507 may be energy signals reflected from a tracked object 508, such as a tennis ball. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, prior to analysis, a video capture card may digitize video frame data.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the sensor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may measure from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters (see FIG. 7), 2) session diagnostics, 3) prescription for improvement, 4) a history comparison of trajectory data from different sessions, 5) individual/group comparisons of trajectory session data, 6) video analysis and editing tools, 7) simulations (e.g., predicting a player's driving distance improvement based upon changing one or more of their swing parameters and 8) entertainment. As an example of entertainment, a player's trajectory average trajectory parameters and variability may be used in trajectory simulations for a video tennis game or another game where the parameters have been measured. Two players that have used the system 100 may both enter their parameters and compete against one another in the video game. The player may also use the game to see how they match up against professional or other athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system as described with respect to FIG. 6 may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Calculating Tennis Stroke Dynamics

The trajectory (flight) of a tennis ball may be predicted based on an understanding of the dynamics of the racquet motion and the interaction of the racquet face (strings) with the ball when contact occurs. Depending on the type of shot (serve, ground stroke, volley, overhead), different parameters are important in measuring performance.

The serve involves the most complex combination of movements of the player, racquet, and ball. All of these are important in producing the serve. The first part of the ball's motion is the toss. From the instant the ball is released from the server's hand, the trajectory of the ball is primarily affected by gravity. A secondary, but potentially important, effect is the action of wind on the ball while it is on its way up or down. The trajectory of the ball may be observed directly by the vision system, or it can be calculated based on the initial conditions (position and velocity) at the instant the ball is released from the server's hand. Accounting for the effects of wind on the trajectory of the toss requires the wind speed and direction to be known a priori and provided as an input to the calculation.

While the ball is in motion from the toss, the server swings the racquet overhead to strike the ball near the apex of its trajectory. Several parameters are important at the instant of contact: racquet head speed and direction, orientation of the racquet head, location of the ball at time of impact (height, longitudinal, and lateral positions), and ball speed. It may also be important to account for the properties of the ball (size, pressure, felt), racquet (frame stiffness, string type and tension), and environment (temperature, air density, humidity).

The interaction of the racquet face and the ball produces the motion of the ball. The ball motion at the instant it loses contact with the racquet face may be fully described by its position (x,y,z), velocity (Vx, Vy, Vz), and spin (Wx, Wy, Wz). This initial condition may be predicted by modeling the interaction of the racquet strings and ball, or measured by direct observation of the ball using the vision system (The vision system may comprise cameras or other measuring devices, associated software and processors used to determine a trajectory of an object, such as tennis ball).

The speed of the racquet approaching the ball may be decomposed into a component normal to the racquet face and two components tangential to it. The normal component of the speed determines the speed and direction of the ball, while the tangential components determine the spin (topspin/underspin and side spin). The speed of the ball leaving the racquet depends on the efficiency of momentum transfer from the racquet to the ball. This, in turn, depends on the elasticity of the strings and the ball. If the collision is perfectly elastic and the racquet is much more massive than the ball, then the speed of the ball as it leaves the racquet will be twice the normal speed of the racquet face. If this approximation is not valid, it may be possible to calibrate the momentum transfer efficiency by using the vision system to observe a number of racquet strokes under a variety of conditions (such as speed and spin) and "learn" the characteristics of a particular racquet and ball pair.

The spin imparted to the ball by the racquet is the result of torque applied to the ball by the tangential speed of the racquet face. The ball will acquire angular velocity about the vertical axis (side spin) and lateral axis (top spin) that are important in predicting the subsequent trajectory of the ball. As a first approximation, it can be assumed that the ball acquires all of the tangential velocity of the racquet. If this approximation is not valid, it may be possible to calibrate a racquet/ball pairing by direct observation as described in the preceding paragraph.

Once the initial motion of the ball is known—position, velocity, and spin vectors—the trajectory of the ball may be calculated from its dynamics of flight and used to provide a player feedback information in real-time. The variation of the aerodynamic properties (lift, drag, and side force) with the ball's velocity and spin is a potentially significant effect that may be included as needed to achieve the desired level of accuracy in the performance parameters of interest.

An example of one methodology for calculating the trajectory of a tennis ball is provided below for the purposes of illustration only. More or less complex simulations may be used and this example is not meant to be a limiting description of analysis and feedback devices described herein. The equations of motion shown represent a system of coupled nonlinear ordinary differential equations; as such, no analytical, closed-form solution exists. With the computing power readily available in today's low-cost personal computers, one practical approach to solving these equations is to apply a numerical integration scheme. For example, it is possible to perform an explicit time integration scheme using a small time increment, Δt, to advance the solution until the desired results are obtained. This example is provided for illustrative purposes only, as many other types of numerical schemes may be employed with devices of the present disclosure.

Using a spreadsheet computation, a numerical integration may be performed to generate a database of the trajectory. The database may contain the relevant variables at each time step—acceleration, velocity position, flight angle, etc. A database query may then performed to extract the parameters of interest, such as, but not limited to, flight distance, maximum height, final speed, angle, etc.

Equations of Motion:

The motion of a tennis ball in flight may be described by the following equations.

$$\ddot{x} = -\frac{\rho s}{2m}[(\dot{x}+w_x)^2 + \dot{y}^2 + (\dot{z}+w_z)^2][C_D\cos\alpha\cos\beta + C_L\sin\alpha\cos\beta]$$

$$\ddot{y} = \frac{\rho s}{2m}[(\dot{x}+w_x)^2 + \dot{y}^2 + (\dot{z}+w_z)^2][C_L\cos\alpha\cos\beta - C_D\sin\alpha\cos\beta] - g$$

$$\ddot{z} = -\frac{\rho s}{2m}[(\dot{x}+w_x)^2 + \dot{y}^2 + (\dot{z}+w_z)^2][C_D\sin\beta + C_N\cos\alpha]$$

where the variables are defined as, $\ddot{x}, \ddot{y}, \ddot{z}$ Acceleration components in x, y, z direction
$\dot{x}, \dot{y}, \dot{z}$ Velocity components in x, y, z, direction
x Direction toward net
y Vertical
z To the right when facing net
$\rho$ Air density
s Cross-sectional area of ball
m Mass of ball
$w_x, w_z$ Wind velocity components
$C_D$ Drag coefficient
$C_L$ Lift coefficient
$C_N$ Side force coefficient
$\alpha$ Angle of flight above horizontal
$\beta$ Angle of flight to right of target
g Gravitational acceleration The inputs to the trajectory computation may be initial ball speed and flight angle and wind speed. The ball speed, flight angle, and spin may be deduced from the racquet speed and orientation. The analysis and feedback devices described herein may be used to acquire these initial conditions.

For example, using a camera based system, capturing the position of the ball 5 or more times within the first 0.1 seconds of flight, or within the first 1 meter of flight, alternatively, allows the initial conditions for trajectory computation of a tennis ball to be determined. The calculations are fast enough to allow immediate feedback to be provided to a user. For instance, the calculation described above may be performed in less than 1 second. Of course, this calculation time may very depending on the performance of the computer hardware employed and the numerical integration scheme used.

An example calculation is provided as follows.

| Sample Trajectory Calculation | |
| --- | --- |
| Racquet orientation, deg. | 0 |
| Initial speed, m/s | 40 |
| Headwind, m/s | 0 |
| Initial flight angle, deg. | 0 |
| Initial spin, rpm | 0 |
| Time step, sec | .01 |
| Air density, kg/m^3 | 1.225 |
| π | 3.141593 |

-continued

Sample Trajectory Calculation

| | |
|---|---|
| Ball radius, m | .033 |
| Drag area, $\pi*R^2$, $m^2$ | 0.001327 |
| Ball mass, kg | 0.05 |
| $C_D$ | 0.63 |
| $C_L$ | 0.0 |
| Initial inclination, rad | 0.174533 |
| Initial x-velocity, m/s | 40.0 |
| initial y-velocity, m/s | 0.0 |
| Gravitational acceleration, m/s | 9.8 |
| Initial horizontal velocity, m/s | 40.0 |
| Initial vertical velocity, m/s | 0.0 |
| Flight distance, m | 25.0 |
| Max height, m | 9.0 |
| Final speed, m/s | 21.8 |
| Final angle, deg. | −17.2 |
| Final horizontal velocity, m/s | 20.8 |
| Final vertical velocity, m/s | −6.5 |

The calculated trajectory (not shown) provides x and y distances where y is a height above the ground as a function of time. The table above lists some constants used in the calculation and some results from the calculation.

In the example above, as previously described, in one embodiment the initial conditions may be derived from data captured using an analysis and feedback device. In another embodiment, the device may store a database of racquet and ball properties. Thus, the player may simply enter the racquet and ball descriptors (e.g., string type and tension, brand and age of ball), and the device may be operable to look up the appropriate data. In other embodiments, the device may have some wind measuring capabilities as well as other capabilities for determining ambient conditions that may affect a trajectory, such as temperature, humidity and air density (which may vary with altitude as well).

The analysis and feedback device may store the calculated trajectory results and the trajectory shown above may be displayed to the player. Also, as previously, feedback information, derived from the trajectory may be output to the player. As another example, a trajectory of the ball may be output in a 3-D format including, but not limited to, one or more of simulated flight paths in 3-D and a ground track of the ball. Many different aspects of the trajectory may be output and these are provided for illustrated purposes only.

The trajectory for strokes other than the serve—ground strokes, volleys, and overheads—can be predicted using the same techniques described above. The only difference is that in the case of strokes other than the serve, the ball is approaching the player's racquet with significant velocity and spin. It is necessary to initialize the computation of the stroke with the velocity and spin of the ball, which maybe measured by the vision system by direct observation.

Another potentially useful aspect of the tennis ball's trajectory to understand is its bounce dynamics Depending on the speed, angle, and spin the ball possesses as it contacts the court surface, and the physical properties of the ball and court, the bounce exhibits significant variation. This is an important strategic aspect of the competitive game of tennis, and players expend considerable effort understanding and controlling the bounce. A kick serve, for example, produces a bounce that sends the ball in a significantly different direction than it was traveling immediately before the bounce, resulting in a particularly difficult shot for the opponent to return. A flat ground stroke results in a shallow bounce angle, keeping the ball low after the bounce and therefore difficult to return with power. Grass courts produce skidding bounces that don't take as much speed off the ball as hard courts, resulting in more challenging conditions for the return shot. This encourages grass court competitors to volley the ball more often, so that they do not have to deal with a difficult bounce. In contrast, clay courts and some hard courts slow the ball significantly, and the bounce responds more strongly to spin, favoring a style of play that utilizes a variety of spins to be imparted on the ball.

Because the path of the ball after the bounce is so important to the competitive game, providing feedback about the bounce in training sessions may be valuable. This can be done by direct observation using the vision system, or it can be predicted from the trajectory and an understanding of the bounce characteristics. Using the trajectory prediction method described above, the location, speed, and spin of the ball when it contacts the court surface can be predicted. Then, a model of the bounce dynamics can be used to calculate the change in velocity resulting from contact with the court. This will produce a new initial condition for the ball (location, velocity, and spin) that can be used to continue the trajectory prediction as the ball continues into the opponent's court. The speed of the ball, height of the bounce, and resultant spin after the bounce are examples of parameters useful in assessing a player's performance on a particular shot.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A device for analyzing trajectories of tennis balls, the device comprising:
   one or more cameras for recording video frame data used to characterize a trajectory of a tennis ball generated by a player during a tennis related activity;
   a logic device designed or configured to i) receive the video frame data, ii) identify the tennis ball in the video frame data, iii) determine when a tennis racquet strikes the tennis ball, iv) generate trajectory parameters that characterize one or more states of the tennis ball along its trajectory based on the identified tennis ball in the video frame data, including at least one trajectory parameter measured by the logic device that characterizes a state of the tennis ball when the tennis racquet is determined by the logic device to strike the tennis ball, and v) generate feedback information using the trajectory parameters, wherein the feedback information indicates the at least one trajectory parameter, wherein the logic device is designed or configured to identify a net associated with a tennis court including an upper edge of said net in the video frame data, wherein the logic device is further designed or configured to measure a height of the tennis ball relative to the upper edge of said net when the tennis ball is above the net during a shot of the tennis ball, and wherein the feedback information indicates the measured height of the tennis ball; and
   at least one output mechanism for providing the feedback information.

2. The device of claim 1, wherein the tennis related activity includes a toss of the tennis ball for a serve and wherein the logic device is further designed or configured to measure the trajectory of the tennis ball during the toss and prior to impact with a racquet.

3. The device of claim 1, wherein the feedback information includes one or more of the following 1) a height of a serve toss, 2) a lean of the serve toss, 3) a spin of the serve toss, 4) a consistency of a plurality of serve tosses, 5) an impact position height of a serve, 6) an impact position lean of the serve, 7) a consistency of an impact position of a plurality of serves, 8) an initial speed of the serve, 9) an initial angle of the serve, 10) an initial direction of the serve, 11) an initial spin of the serve, 12) a consistency of the initial speed of the plurality of serves, 13) a consistency of the angle of serve of the plurality of serves, 14) a consistency of the direction of the plurality of serves, 15) a consistency of the spin of the plurality of serves, 16) a calculated speed of the serve, 17) a consistency of the calculated speed of the plurality of serves, 18) a calculated landing speed of the serve, 19) a location of the serve at landing, 20) a spin of the serve at landing, 21) a direction vector of the serve at landing, 22) a consistency of the calculated landing speed for the plurality of serves, 23) a consistency of the location at landing of the plurality of server, 24) a consistency of the spin at landing of the plurality of serves, 25) a consistency of the direction vector of the plurality of serves, 26) a measured landing speed of the serve, 27) a measured location of the serve, 28) a measured spin of the serve, 29) a measured direction vector of the serve, 30) a consistency of the measured landing speed of the plurality of serves, 31) a consistency of the measured location of the plurality of serves, 32) a consistency of the spin measured for the plurality of serves, 33) a consistency of the direction vector measured for the plurality of serves, 34) a location of the crossing point of the net of the tennis ball, 35) a release location of the serve toss and 36) combinations thereof.

4. The device of claim 1, wherein the logic device is further designed or configured to identify a position of a body element of the player participating in the tennis related activity in the video frame data and to determine the position of the body element relative to a marking on the court.

5. The device of claim 1, wherein the logic device is further designed or configured to determine whether a tennis ball hit by a player on a tennis court is inside of or outside of one or more boundary lines associated with the tennis court.

6. The device of claim 1, wherein the logic device is further designed or configured to identify a racquet in the video frame data and wherein the logic device is further designed or configured to determine a position of the racquet as a function of time, a velocity of the racquet as a function of time, an orientation of the racquet as a function of time or combinations thereof.

7. The device of claim 1, wherein the logic device is further designed or configured to identify a body element of the player participating in the tennis related activity in the video frame data and wherein the logic device is further designed or configured to determine a position of the body element, an orientation of the body element, a velocity of the body element or combinations thereof, as a function of time and generate feedback information related to one or more of the position of the body element, the orientation of the body element or the velocity of the body element.

8. The device of claim 1, wherein the logic device is further designed or configured to determine, for the purposes of calibration, a distance from the device to one or more of the tennis ball, a racquet, a marking on a tennis court, a net on the tennis court, a vertical surface against which the tennis ball is being hit or a player hitting the tennis ball.

9. The device of claim 1, further comprising one or more sensors for determining an orientation of the device and wherein the one or more sensors comprise accelerometers or tilt sensors.

10. The device of claim 1, wherein the output mechanism includes a wireless interface for outputting the feedback information to one or more remote devices.

11. The device of claim 10, wherein the remote device is worn.

12. The device of claim 1, further comprising: a housing for the one or more cameras, the logic device, and the at least one output mechanism, the housing having a weight and form factor which facilitate one or more of transport, storage, unobtrusive set-up, calibration, or operation of the device.

13. The device of claim 1, further comprising an input mechanism.

14. The device of claim 13, wherein the input mechanism is a touch screen display.

15. The device of claim 13, wherein the input mechanism is a wireless interface for receiving input from a remote device.

16. The device of claim 1, wherein the logic device is a general purpose computer comprising: a processor, a data storage device, RAM, operating system software, device interfaces, device drivers and trajectory analysis software.

17. The device of claim 1, wherein the device is capable of one of autonomous set-up, autonomous calibration, autonomous operation or combinations thereof.

18. The device of claim 1, wherein after manual input of data by a user, a confirmation of data determined by the device, the logic device is further designed or configured to complete a calibration procedure.

19. The device of claim 1, further comprising:
a memory storage device for storing trajectory session information wherein the trajectory session information comprises one or more of 1) digitized video frame data, trajectory information and feedback information generated for a plurality of trajectories, 2) a trajectory session time, 3) a trajectory session date, 4) a trajectory session location and combinations thereof.

20. The device of claim 1, wherein the device is designed to determine for a plurality of related trajectories captured by the device a consistency for at least one of the trajectory parameters generated for each of the plurality of related trajectories.

21. The device of claim 20, wherein the consistency is determined by calculating a statistical deviation.

22. The device of claim 1, wherein the logic device is further designed or configured to store data related to one or the trajectory of the tennis ball, movements of the player, movements of a racquet captured in the video frame data for use in a video simulation related to tennis.

23. The device of claim 1, wherein the logic device is further designed or configured to identify a boundary line of a tennis court in the video frame data and to determine whether the tennis ball is inside or outside of the boundary line based on the identified tennis ball and the identified boundary line in the video frame data, and wherein the feedback information indicates whether the tennis ball is inside or outside of the boundary line.

24. The device of claim 1, wherein the at least one trajectory parameter includes a height at which the tennis racquet strikes the tennis ball.

25. The device of claim 1, wherein the logic device is designed or configured to determine a height of a serve toss based on the identified tennis ball in the video frame data, and wherein the feedback information indicates the height of the serve toss.

26. The device of claim 1, wherein the logic device is designed or configured to measure a spin of the tennis ball during a serve toss based on the identified tennis ball in the video frame data, and wherein the feedback information indicates the spin.

27. The device of claim 23, wherein the at least one trajectory parameter includes a height at which the tennis racquet strikes the tennis ball.

28. The device of claim 27, wherein the logic device is designed or configured to determine a height of a serve toss based on the identified tennis ball in the video frame data, and wherein the feedback information indicates the height of the serve toss.

29. A device for analyzing trajectories of tennis balls, the device comprising:
one or more cameras for recording video frame data used to characterize a trajectory of a tennis ball generated by a player during a tennis related activity;
a logic device designed or configured to i) receive the video frame data, ii) identify the tennis ball in the video frame data, iii) determine when a tennis racquet strikes the tennis ball, iv) generate trajectory parameters that characterize one or more states of the tennis ball along its trajectory based on the identified tennis ball in the video frame data, including at least one trajectory parameter measured by the logic device that characterizes a state of the tennis ball when the tennis racquet is determined by the logic device to strike the tennis ball, and v) generate feedback information using the trajectory parameters, wherein the feedback information indicates the at least one trajectory parameter, wherein the at least one trajectory parameter includes a height at which the tennis racquet strikes the tennis ball, wherein the logic device is further designed or configured to identify a boundary line of a tennis court in the video frame data and to determine whether the tennis ball is inside or outside of the boundary line based on the identified tennis ball and the identified boundary line in the video frame data, wherein the feedback information indicates whether the tennis ball is inside or outside of the boundary line, wherein the logic device is designed or configured to determine a height of a serve toss based on the identified tennis ball in the video frame data, and wherein the feedback information indicates the height of the serve toss, wherein the logic device is further designed or configured to identify a net associated with a tennis court including an upper edge of said net in the video frame data, wherein the logic device is further designed or configured to determine a position of the tennis ball relative to the upper edge of said net when the tennis ball is above the net, and wherein the feedback information indicates the position of the tennis ball relative to the upper edge of said net; and
at least one output mechanism for providing the feedback information.

30. The device of claim 29, wherein the logic device is designed or configured to measure a spin of the tennis ball during the serve toss based on the identified tennis ball in the video frame data, and wherein the feedback information indicates the spin.

31. A device for analyzing trajectories of tennis balls, the device comprising:
one or more cameras for recording video frame data used to characterize a trajectory of a tennis ball generated by a player during a tennis related activity;
a logic device designed or configured to i) receive the video frame data, ii) identify the tennis ball in the video frame data, iii) generate trajectory parameters that characterize one or more states of the tennis ball along its trajectory based on the identified tennis ball in the video frame data, and iv) generate feedback information using the trajectory parameters, wherein the feedback information indicates at least one of the one or more states, wherein the logic device is further designed or configured to identify a net associated with a tennis court including an upper edge of said net in the video frame data, wherein the logic device is further designed or configured to measure a height of the tennis ball relative to the upper edge of said net when the tennis ball is above the net during a shot of the tennis ball, and wherein the feedback information indicates the measured height of the tennis ball relative to the upper edge of said net; and
at least one output mechanism for providing the feedback information.

32. A method for analyzing trajectories of tennis balls, comprising:
recording video frame data by one or more cameras, the video frame data including images of a tennis ball during a tennis related activity at a tennis court;
receiving the video frame data at a logic device;
identifying, by the logic device, the tennis ball in the video frame data;
generating, by the logic device, trajectory parameters that characterize one or more states of the tennis ball along its trajectory;
generating, by the logic device, feedback information using the trajectory parameters;
identifying, by the logic device, a net associated with the tennis court in the video frame data;
measuring, by the logic device, a height of the tennis ball relative to an upper edge of said net when the tennis ball is above the net during a shot of the tennis ball, wherein the feedback information indicates the measured height; and
outputting the feedback information by an output mechanism.

33. The method of claim 32, further comprising determining, by the logic device, when a tennis racquet strikes the tennis ball, wherein the trajectory parameters includes at least one trajectory parameter that characterizes a state of the tennis ball when the tennis racquet is determined to strike the tennis ball, and wherein the feedback information indicates the at least one trajectory parameter.

34. The method of claim 33, wherein the at least one trajectory parameter includes a height at which the tennis racquet strikes the tennis ball.

35. The method of claim 34, further comprising measuring, by the logic device, a height of a serve toss based on the identified tennis ball in the video frame data, wherein the feedback information indicates the measured height of the serve toss.

36. The method of claim 35, further comprising measuring, by the logic device, a spin of the tennis ball during the serve toss based on the identified tennis ball in the video frame data, wherein the feedback information indicates the measured spin.

37. A device for analyzing trajectories of tennis balls, the device comprising:

one or more cameras for recording video frame data used to characterize a trajectory of a tennis ball generated by a player during a tennis related activity;

a logic device designed or configured to i) receive the video frame data, ii) identify the tennis ball in the video frame data, iii) determine when a tennis racquet strikes the tennis ball, iv) generate trajectory parameters that characterize one or more states of the tennis ball along its trajectory based on the identified tennis ball in the video frame data, including at least one trajectory parameter measured by the logic device that characterizes a state of the tennis ball when the tennis racquet is determined by the logic device to strike the tennis ball, and v) generate feedback information using the trajectory parameters, wherein the feedback information indicates the at least one trajectory parameter, wherein the logic device is further designed or configured to identify a net associated with a tennis court, wherein the logic device is further designed or configured to measure a height of the tennis ball when the tennis ball is above the net, and wherein the feedback information indicates the measured height; and at least one output mechanism for providing the feedback information.

38. The device of claim 1, wherein the logic device is configured to calculate an average height of at least one tennis ball above the upper edge of said net for multiple tennis shots, and wherein the feedback information indicates the average height.

39. The device of claim 24, wherein the logic device is configured to calculate an average height at which the tennis racquet strikes a tennis ball for multiple tennis shots, and wherein the feedback information indicates the average height.

* * * * *